United States Patent [19]

Roberts et al.

[11] Patent Number: 4,979,113
[45] Date of Patent: Dec. 18, 1990

[54] AUTOMATED VEHICLE CONTROL

[75] Inventors: Malcolm T. Roberts, Oadby; Michael P. Robins, Rugby; Ian E. Sharrott, Stoney Stanton, all of England

[73] Assignee: The General Electric Company, plc, England

[21] Appl. No.: 346,128

[22] Filed: May 2, 1989

[30] Foreign Application Priority Data

May 13, 1988 [GB] United Kingdom ........... 8811441

[51] Int. Cl.⁵ .................................. G06F 15/50
[52] U.S. Cl. .......................... 364/424.02; 180/168; 318/587; 364/461
[58] Field of Search .............. 364/424.01, 424.04, 364/449, 461, 424.02; 180/167–169; 340/988, 989; 318/587

[56] References Cited

U.S. PATENT DOCUMENTS

| | | | |
|---|---|---|---|
| 4,379,497 | 4/1983 | Hainsworth et al. | 180/168 |
| 4,500,970 | 2/1985 | Daemmer | 180/168 |
| 4,653,002 | 3/1987 | Barry | 180/167 |
| 4,674,048 | 6/1987 | Okumura | 364/424.02 |
| 4,764,873 | 8/1988 | Libby | 364/461 |
| 4,809,178 | 2/1989 | Ninomiya et al. | 364/461 |

Primary Examiner—Gary Chin
Attorney, Agent, or Firm—Kirschstein, Ottinger, Israel & Schiffmiller

[57] ABSTRACT

A vehicle guidance system includes a computer for generating signals to control a number of vehicles to carry out movements within a predetermined area. Data identifying locations of notional points on the floor of the area are entered into the computer together with a look-up table specifying pairs of those points between which movements of vehicles may be required, and specifying which other of the movements between pairs of points must be considered as potential causes of collision between vehicles when any particular movement is to be effected. When a vehicle movement is requested, the computer determines from the table which other movements must be considered, and determines whether any such movements are being effected at that instant. If so, the computer inhibits the requested vehicle movement or, if not, it initiates the requested vehicle movement.

4 Claims, 2 Drawing Sheets

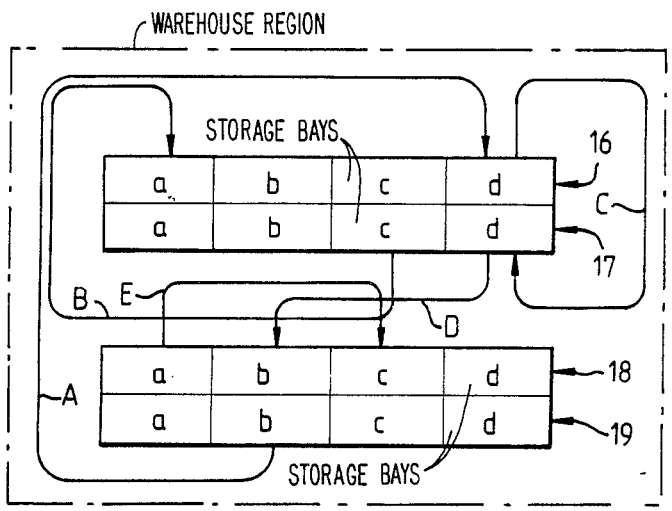
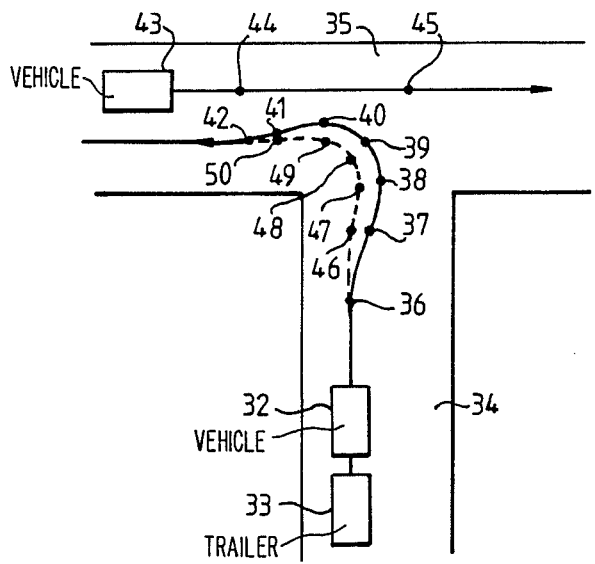
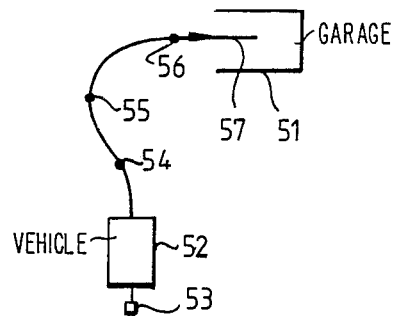

AUTOMATED VEHICLE CONTROL

BACKGROUND OF THE INVENTION

1. Field of the Invention

This invention relates to the control of automated vehicles which move around a site, such as a factory or a warehouse, in accordance with control signals generated by a computer. The invention is particularly relevant to vehicles which are controlled over radio or other remote control links and do not rely on guidance wires or tracks.

2. Description of Related Art

Our British Patent No: 2,143,395 discloses such a system in which a number of mobile trucks are controlled and guided under the overall control of a base station. The trucks are utilised to transfer material between a store area and a work position. Finished workpieces are transferred by means of one of the trucks to a holding area for removal and utilisation as required. The base station allocates destinations to each of the trucks via a communication link, such as a radio or infra-red link.

Each vehicle is able to determine its own position relative to any location within the site. Each vehicle monitors its own position as it moves along a path to its required destination, and continuously transmits its position back to the base station, so that the base station can control the truck movements so as to avoid collisions.

Typically the storage area, the work position and the holding area may each comprise a large number of bays divided into separate sections by aisles along which the trucks must travel.

A possible way to prevent collisions between vehicles in such a system, is for the computer controlling the vehicles to store the positions of zones which only one vehicle is allowed to occupy at a time, and to ensure that if a vehicle has been instructed to move into a zone no other vehicle can approach or enter that zone. It will be apparent that such a mode of operation limits the efficiency of the system, as much time can be wasted while vehicles are waiting to move.

SUMMARY OF THE INVENTION

An object of the present invention is to provide a vehicle control system by which such waiting time can be reduced.

According to one aspect of the invention there is provided a method of operating a vehicle guidance system which includes computer means for generating signals to control a plurality of vehicles to execute movements within a predetermined area, the method comprising the steps of: entering into the computer means data identifying locations of notional points on the floor of said area; entering a look-up table specifying pairs of such points between which movements of vehicles may be required and specifying which other of said movements between pairs of points must be considered as potential causes of collision between vehicles when any particular movement is to be effected; and, when a vehicle movement is requested, causing the computer means to determine from the table which other movement or movements must be considered, and to determine whether any such other movement is being effected and if so to inhibit the requested vehicle movement and if not to initiate the requested vehicle movement.

According to another aspect of the invention there is provided a vehicle control and guidance system comprising computer means for generating signals to control a plurality of vehicles to execute movements within a predetermined area and operative to store data identifying locations of notional points on the floor of said area; and means operable by a user of the system to enter into the computer means a look-up table specifying pairs of said points between which movements of vehicles may be required and specifying which others of said movements between pairs of points must be considered as potential causes of collision between vehicles when any particular movement is to be effected; the computer being operative, when a vehicle movement is requested, to determine from the look-up table which other movement or movements must be considered and to determine whether any such other movement is being effected and if so to inhibit the requested vehicle movement and if not to initiate the requested vehicle movement.

By use of the concept of notional points and the look-up table, vehicle movements can be defined between relatively closely-spaced points and, provided that there is no vehicle at present executing a movement between two specific points, any vehicle may be instructed to travel between those points or to travel close to or crossing a notional line joining those points, without fear of collision.

BRIEF DESCRIPTION OF THE DRAWINGS

Embodiments of the invention will now be described, by way of example, with reference to the accompanying drawings, in which:-

FIG. 3 shows, on an enclosed scale, a region of the plan of FIG. 2, illustrating vehicle movements, FIG. 4 is a schematic plan view illustrating vehicle movements at a T-junction, and FIG. 5 illustrates the docking of a vehicle in a garage.

DETAILED DESCRIPTION OF THE PREFERRED EMBODIMENTS

Figure 1:
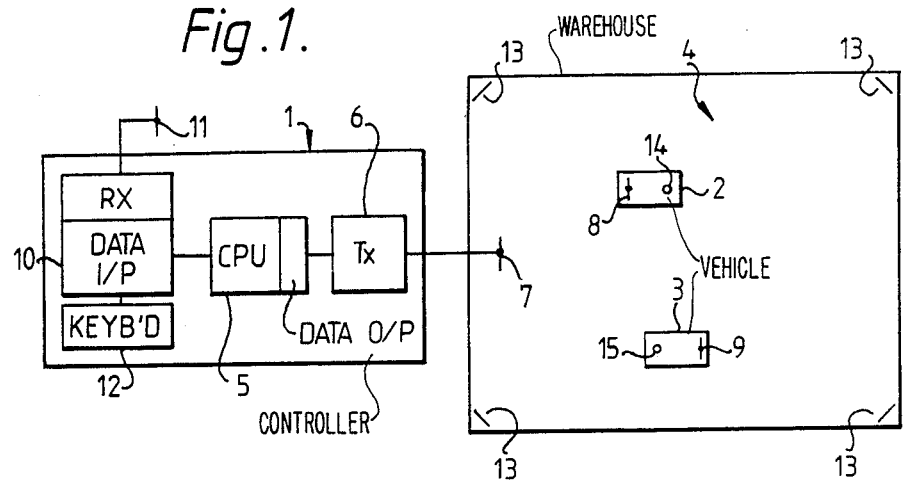
FIG. 1 is a schematic block diagram of vehicle control and guidance apparatus.

Referring to FIG. 1, a controller 1 for controlling the movement of vehicles such as the vehicles 2 and 3 around the floor 4 of a warehouse comprises a computer 5 which generates vehicle control signals which are fed to a radio transmitter 6. The signals are used to modulate a carrier wave which is transmitted via an antenna 7 and is received by antennas 8 and 9 on the vehicles 2 and 3. Data are fed into the computer 5 from data input means 10 which includes a radio receiver which receives position data from the vehicles 2 and 3 via an antenna 11. The data may alternatively be transmitted by other means, such as via an ultrasonic or laser link. The data input means may also comprise sensors for automatic sensing of conditions within the warehouse, and a keyboard 12 is provided for manual data entry.

For the sake of example, the navigating system of the vehicles is taken as being as described in our above-mentioned British Patent No: 2,143,395, but it will be appreciated that the present invention could equally well be used with any other navigation system. For navigation purposes, coded retro-reflective targets 13 are positioned, wherever necessary, around the warehouse. Rotary laser scanners 14, 15 are fitted on the vehicles 2 and 3, respectively, and the navigation system continuously determines, from reflections from the coded targets, and by triangulation, the exact position of each vehicle.

Figure 2:
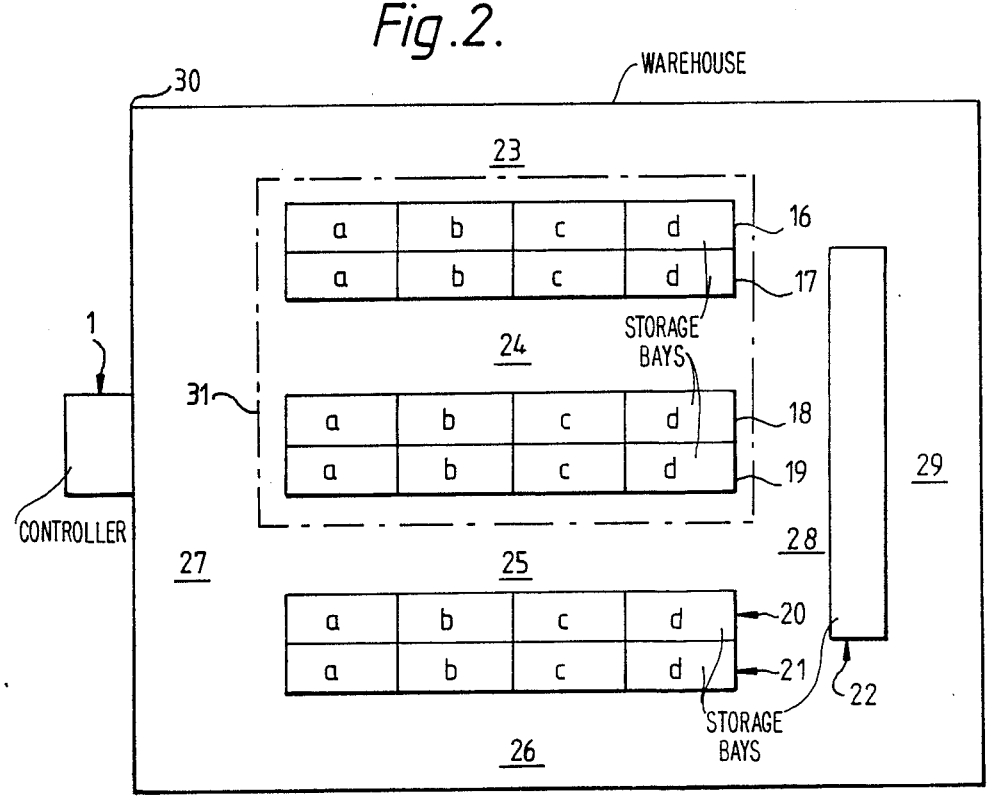
FIG. 2 is a schematic plan of an example of a warehouse around which guided vehicles move under computer control.

FIG. 2 illustrates, schematically, a plan of the warehouse showing storage bays 16 to 22, each with docking points a to d at which goods are loaded and unloaded. The bays are reached from aisles 23 to 29. In the past it would have been necessary to ensure that two vehicles could never simultaneously enter any aisle.

In the present invention, however, notional "pads" are defined at each docking point by determining their coordinates relative to a datum position, such as the corner 30. These pad coordinates are stored in the computer 5. In order to prevent collisions, the supervisor of the warehouse enters, via the keyboard 12, a look-up table which specifies pad designations at the ends of every vehicle movement which may be required. For example, a vehicle may have to move from the docking point (DP) 18d to the DP 17b, and another vehicle from the DP 21c to the DP 16b, and so on. The supervisor then enters into the table the end pad designations for all of the movements which could conflict with each required movement in such a way that there could be a collision if vehicles were to carry out the movements simultaneously. Details of an example of a portion of such a table will be described later. When the data input means 10, or the program in the computer 5, commands a vehicle movement, the computer determines, from the look-up table, which other movements must be considered and, if such another movement is already being carried out by a vehicle, inhibits the required movement until the conflicting movement is completed. On the other hand, if no such conflicting movement is in progress, it allows the required movement.

It will be apparent, therefore, that instead of confining vehicle movements to unoccupied aisles, the invention allows simultaneous movements in any aisle provided that the movements are not conflicting movements as designated by the look-up table. Greatly improved efficiency of vehicle operation is thereby achieved.

FIG. 3 shows a region 31 of the layout of FIG. 2 in greater detail, to illustrate the derivation of the look-up table. Considering vehicle movements within that region, a vehicle movement A from the DP 19b to the DP 16d, a movement B from the DP 17c to the DP 16a, a movement C from the DP 16d to the DP 17d, a movement D from the Dp 18a to the Dp 18c, and a movement E from the DP 17c to the DP 18b, (together with others which will not be detailed for the sake of clarity of this example) might be required in that region.

The supervisor would enter the end pad designations for those movements into the look-up table and would then consider each other required movement to determine whether a collision situation could occur. For example, considering the movement A, the only other movement which could cause a collision would be the movement B. The movement C could be in conflict with the movements A and D, whilst the movement D could be in conflict with the movements C and E and possibly with the movement B, depending upon the width of the vehicles and the spacing between the pad positions for adjacent docking points. The look-up table would therefore be built up as follows.

| Required Movement | End Pad Designations for Docking Points | Conflicting Movements | End Pad Designations for Docking Points |
| --- | --- | --- | --- |
| A | 19b–16d | B | 17c–16a |
| B | 17c–16a | A | 19b–16d |
|   |   | D | 17d–18b |
|   |   | E | 18a–18c |
| C | 16d–17d | A | 19b–16d |
|   |   | D | 17d–18b |
| D | 17d–18b | B | 17c–16a |
|   |   | C | 16d–17d |
|   |   | E | 18a–18c |
| E | 18a–18c | D | 17d–18b |
|   |   | B | 17c–16a | and so on

The "pad" concept could be extended to take into account the coordinates of points through which a vehicle is to pass without stopping. Such points could be designated points along any required vehicle route, such as shown in FIG. 4. In that case, a vehicle 32 pulling a trailer 33 is to move along an aisle 34 to a T-junction, and there turn left into an aisle 35. Due to the overall length of the combined vehicle and trailer, the vehicle must swing out as it turns left, and the computer causes the vehicle to deviate from a straight line along a path defined by points such as the points 36–42, the coordinates of which are known to the computer. A vehicle 43 could be travelling in the opposite direction along the aisle 35, and, if both vehicles were allowed to continue, a collision could occur at or near the point 40. If points 44 and 45 are designated along the path of the vehicle 43, just outside the potential collision area, the computer can ensure that if the vehicle 32 and the trailer 33 are moving between the points 36 and 42, the vehicle 43 cannot move between the points 44 and 45, and vice versa. A further set of points 46–50 could be designated along a path of smaller deviation, for use when the vehicle 32 is travelling without the trailer 33.

Similarly, a vehicle could be directed into a docking point with a correct heading by using the "points" concept. FIG. 5 shows a docking point 51, such as a garage, into which a vehicle 52 is to be moved from a docking point 53. The vehicle must enter the garage accurately within the doorway, and at the correct angle, to avoid colliding with the garage walls. Points 54–56 are designated along the required path for correct entry of the vehicle. The vehicle's navigation system is commanded by the computer to direct the vehicle from the point 54 at the required heading to reach the point 55. The path to be followed thereafter to bring the vehicle to the required heading to enter the garage along a path 57 is derived by a splining operation.

Alternative sets of "pads" may be overlaid along any particular route, to take account of the length and/or width of the vehicle to be moved, different sets being allocated to different types of vehicle. For example, one set could be allocated to a vehicle towing a trailer and another set to a vehicle without a trailer.

If any new movement between pads and/or points is required, the data for effecting such movement, and the data relating to potential collision movements, can readily be added to the look-up table by the supervisor at any time.

We claim:

1. A method of operating a vehicle guidance system which includes computer means for generating signals to control a plurality of vehicles to execute movements over a floor within a predetermined area, the method comprising the steps of: entering into said computer means data identifying locations of notional points on the floor of said area; entering into said computer means a look-up table which specifies a plurality of pairs of said points for each of said pairs a vehicle movement will be required between one point and the other point of said pair, and said look-up table also specifies, for each said required vehicle movement, other pairs of said plurality of pairs of points which define vehicle movements which must be considered as potentially resulting in collision with a vehicle making said required movement; generating a signal for requesting movement of a first vehicle between a first said pair of points; and, when said movement of said first vehicle is requested, said computer means determining from said table which potential collision movements must be considered, and determining whether any vehicle is carrying out any of said potential collision movements and, if so, inhibiting said requested movement of said first vehicle and, if not, initiating said requested movement of said first vehicle.

2. A method as claimed in claim 1, wherein coordinates of intermediate points along a path to be steered by said first vehicle in moving between said first pair of points are stored; and wherein when said first vehicle is moving along said path, movement of another vehicle along a second path adjacent said intermediate points is inhibited by the computer means.

3. A method as claimed in claim 2, wherein respective sets of said coordinates of intermediate points are stored for different paths between said first pair of points; and wherein a particular one of said sets is selected in dependence upon dimensions of said first vehicle.

4. A vehicle control and guidance system, comprising: computer means for generating signals to control a plurality of vehicles to execute movements over a floor within a predetermined area, and operative for storing data identifying locations of notional points on the floor of said area; means operable by a user of the system for entering into the computer means a look-up table which specifies a plurality of pairs of said points for each of said pairs a vehicle movement will be required between one point and the other point of said pair, and said look-up table also specifies, for each required vehicle movement, other pairs of said plurality of pairs of points which define vehicle movements which must be considered as potentially resulting in collision with a vehicle making said required movement; and means for requesting movement of a first vehicle between a first said pair of points; said computer means being operative, when said movement of said first vehicle is requested, to determine from said table which potential collision movements must be considered, and to determine whether any vehicle is carrying out any of said potential collision movements, and, if so, to inhibit said requested movement of said first vehicle and, if not, to initiate said requested movement of said first vehicle.

* * * * *